May 1, 1928.
C. O. MOOK
SCRAPER FOR ICE CREAM DISHERS
Filed Dec. 24, 1925
1,667,734
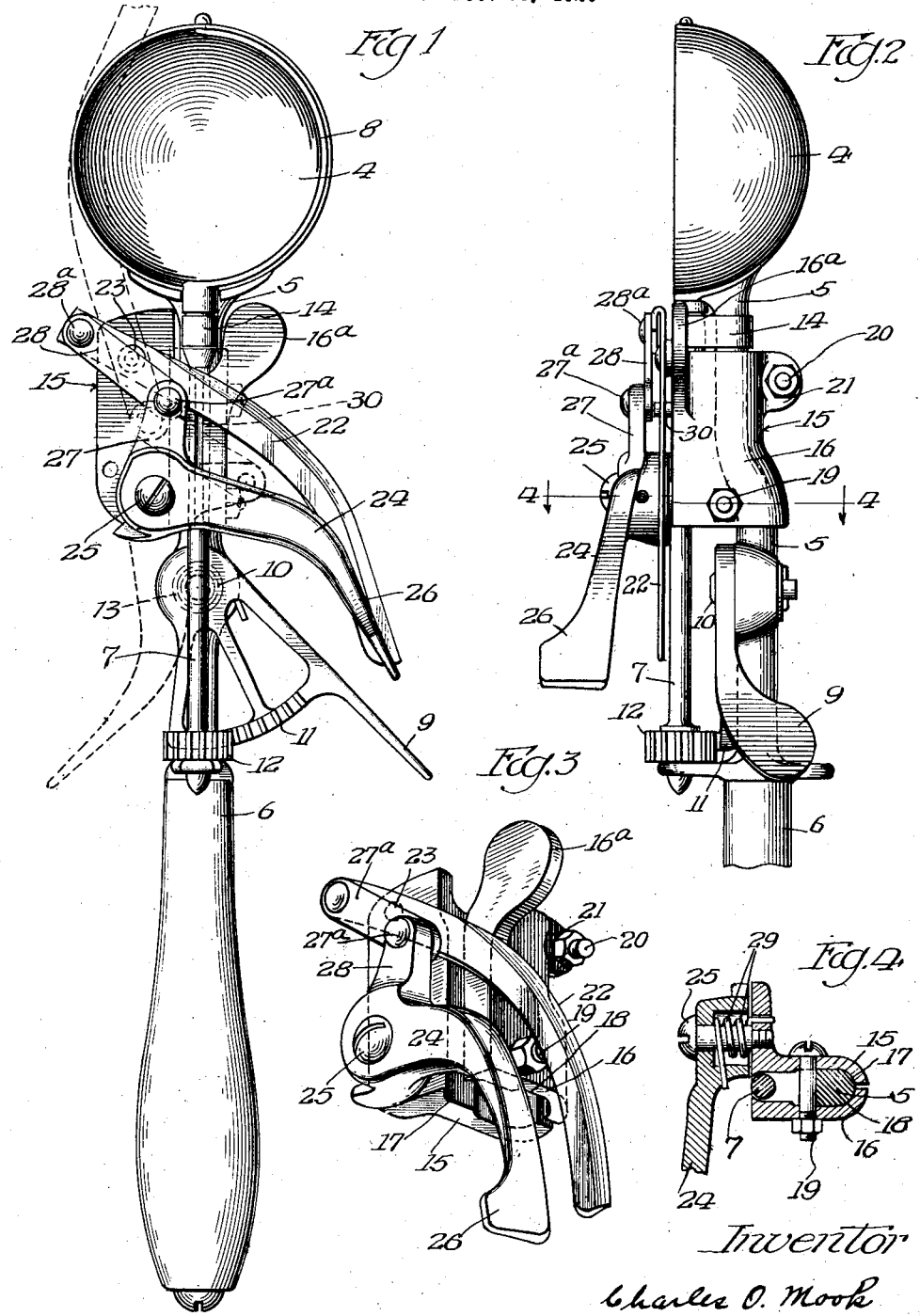
Inventor
Charles O. Mook
By Fred Gerlach
his Atty Patented May 1, 1928.

1,667,734

UNITED STATES PATENT OFFICE.

CHARLES O. MOOK, OF KANSAS CITY, MISSOURI, ASSIGNOR TO THE GILCHRIST COMPANY, OF NEWARK, NEW JERSEY, A CORPORATION OF NEW JERSEY.

SCRAPER FOR ICE-CREAM DISHERS.

Application filed December 24, 1925. Serial No. 77,448.

The invention relates to devices for scraping excess material from dishers. In the use of ice-cream dishers, it is sometimes desired to scrape the excess from the bowl so that a substantially uniform quantity will be served. It has heretofore been proposed to use a blade to sweep across the mouth of the bowl for this purpose, and the object of the present invention is to provide an improved device which is adapted to be attached to an ice-cream disher of usual construction and which may, if desired, be removed in event that it is desired to use the disher without the blade. Another object of the invention is to make it possible to make an attachment which may be sold separately from the disher and applied thereto by the user.

The invention consists in the several novel features hereinafter set forth and more particularly defined by claims at the conclusion hereof.

In the drawings: Fig. 1 is a plan of an ice-cream disher equipped with the invention. Fig. 2 is a side elevation. Fig. 3 is a perspective of the support for the blade and its operating mechanism, separated from the disher. Fig. 4 is a section on line 4—4 of Fig. 2.

The invention is exemplified in connection with an ice-cream disher of the form shown in Letters Patent of the United States No. 1,132,657, dated March 23, 1915, which comprises a bowl 4; a shank 5 rigidly secured to the bowl and provided with a handle 6; a shaft 7 extending longitudinally of and overlying the shank and fixed to a scraper 8 adapted to sever the ice-cream from the bowl so that it may be discharged from the bowl; a finger operable lever 9 pivoted at 10 to the shank and provided with a rack 11; and a pinion 12 operated by the rack to rotate the scraper in the bowl. The lever is retracted by a spring 13 housed between the lever and the shank, as well understood in the art. A clip 14 holds the outer end of the shaft against displacement from the bowl. The scraper shaft and the pinion are removable from the bowl for cleaning purposes, as more fully pointed out in the aforesaid patent.

The attachment comprises a support which consists of two members 15 and 16. These members are recessed, as at 17 and 18, to fit against the sides of the shank 5 and are adapted to be rigidly and fixedly clamped to the shank by a screw 19 which extends through said members above the shank and a screw 20 which passes through lugs 21 on said members respectively. A blade 22 is pivoted at 23 to the supporting member 15 and is adapted to sweep across the mouth of the bowl to sever any excess of material from the mass in the bowl, so that the bowl will be uniformly loaded in serving. A lever 24 is pivoted on a stud 25 which is screwed into member 15 and comprises a finger piece 26 adapted to be operated by the thumb of the hand of the operator which grasps the handle 6 and an arm 27. Said arm has pivoted thereto at 27ª a link 28 which is pivoted at 28ª to the blade 22. By pushing the finger piece 26 to the left, lever 24 will operate link 28 to swing the blade 24 across the mouth of the bowl and sever the excess material from that in the bowl.

Lever 24 is retracted by a spring 29 which is coiled around stud 25 and is housed in a socket or recess formed in lever 24. The rearward movement of blade 22 is limited by a pin 30 which is secured in member 15 and is adapted to engage the rear edge of the blade. Member 16 is provided with an integral lug 16ª which has a substantially flat surface which is disposed on approximately the same plane as the outer edge of bowl 4. This flat surface forms a guide for blade 22 as it sweeps adjacent the outer edge of the bowl or therefrom.

The invention exemplifies a construction in which the support for the blade is removably clamped to the shank of the disher, so that it may be separately manufactured and applied to ice-cream dishers of existing constructions or removed therefrom when its use is not desired.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. In a device of the character described, the combination of a blade for scraping excess material from a disher-bowl, a support on which the blade is mounted, means mounted on the support to operate the blade across the bowl, and means for removably clamping the support to the disher.

2. In a device of the character described, the combination of a blade for scraping excess material from a disher-bowl, a support comprising a pair of members, on one of which the blade is pivotally mounted, a lever pivoted on the support and operatively connected to the blade, and means for clamping the members together to secure the support to the disher.

3. The combination with an ice-cream disher comprising a bowl, a shank on the bowl, a scraper movably mounted in the bowl and a lever pivoted to the shank and operatively connected to the scraper, of a support removably secured to the shank, and a blade for scraping excess material from the bowl pivotally mounted on the support and operative to sweep across the mouth of the bowl.

4. The combination with an ice-cream disher comprising a bowl, a shank on the bowl, a scraper movably mounted in the bowl and a lever pivoted to the shank and operatively connected to the scraper, of a support removably secured to the shank, a blade for scraping excess material from the bowl mounted on the support, and a lever pivotally connected to the blade and mounted on the support.

5. The combination with an ice-cream disher comprising a bowl, a shank on the bowl, a scraper rotatable in the bowl, a scraper-shaft extending lengthwise of the shank and a lever pivoted to the shank and operatively connected to the scraper-shaft, of a support, a blade for scraping excess material from the bowl, mounted on the support, and means for removably clamping the support to the shank.

6. The combination with an ice-cream disher comprising a bowl, a shank on the bowl, a scraper rotatable in the bowl, a scraper-shaft extending lengthwise of the shank and a lever pivoted to the shank and operatively connected to the scraper-shaft, of a support, a blade for scraping excess material from the bowl, mounted on the support, and means for removably clamping the support to the shank, said blade being mounted to swing over the shaft.

7. The combination with an ice-cream disher comprising a bowl, a shank on the bowl, a scraper rotatable in the bowl, a scraper-shaft extending lengthwise of the shank and lever pivoted to the shank and operatively connected to the scraper-shaft, of a support, a blade for scraping excess material from the bowl, mounted on the support, a lever for operating the blade pivoted to said support, and means for removably clamping the support to the shank.

8. The combination with an ice-cream disher comprising a bowl, a shank on the bowl, a scraper rotatable in the bowl, a scraper-shaft extending lengthwise of the shank and a lever pivoted to the shank and operatively connected to the scraper-shaft, of a support, a blade for scraping excess material from the bowl, mounted on the support, a lever for operating the blade, pivoted to said support, and means for removably clamping the support to the shank, said blade being mounted to swing over the shaft.

Signed at Kansas City, Missouri, this 21 day of December, 1925.

CHARLES O. MOOK.